United States Patent [19]
Walsh et al.

[11] Patent Number: 5,515,398
[45] Date of Patent: May 7, 1996

[54] MODEM LINE PROBING SIGNAL TECHNIQUES

[75] Inventors: Dale M. Walsh, Golf; Vladimir Parizhsky, Chicago, both of Ill.

[73] Assignee: U.S. Robotics, Inc., Skokie, Ill.

[21] Appl. No.: 212,974

[22] Filed: Mar. 15, 1994

[51] Int. Cl.⁶ .................... H04B 1/38; H04L 5/16
[52] U.S. Cl. .............. 375/222; 375/227; 370/17; 379/6
[58] Field of Search .................. 379/90, 1, 6, 22, 379/27, 30; 332/123; 375/222, 223, 224, 227; 370/13, 15, 17; 455/67.1, 67.4

[56] References Cited

U.S. PATENT DOCUMENTS

| | | | |
|---|---|---|---|
| 5,048,054 | 9/1991 | Eyuboglu et al. | 375/222 |
| 5,048,056 | 9/1991 | Goldstein | 375/39 |
| 5,054,034 | 10/1991 | Hughes-Hartogs | 375/222 |
| 5,214,637 | 5/1993 | Sridhar et al. | 375/222 |
| 5,265,151 | 11/1993 | Goldstein | 379/97 |
| 5,291,520 | 3/1994 | Cole | 375/34 |

OTHER PUBLICATIONS

On Minimizing the Peak–to–Average Power Ratio for the Sum of N Sinusoids, by D. R. Gimlin, Senior Member, IEEE, and C. R. Patisaul, Member, IEEE Transactions Communications, vol. 41, No. 4, Apr. 1993.

Excerpt, Modem Handbook for the Communications Professional, Cass Lewart (Elsevier), pp. 258–261 (Copyright 1987).

*Primary Examiner*—Young T. Tse
*Assistant Examiner*—Don Vo
*Attorney, Agent, or Firm*—Banner & Allegretti, Ltd.

[57] ABSTRACT

Techniques for generating a line probing signal. The probing signal is comprised of a plurality of different tones, where the tones have a predetermined phase relationship. The signal may be sent over a communication channel, such as a telephone line. By so using the line probing signal, the non-linearity of the electrical characteristics of the telephone line may be measured with increased accuracy.

12 Claims, 4 Drawing Sheets

MODEM LINE PROBING SIGNAL TECHNIQUES

BACKGROUND OF THE INVENTION

The present invention relates to modems and, more particularly, to techniques for generating a modem line probing signal suitable for analyzing the characteristics of telephone lines. Apparatus for generating line probing signals have been used in the past. For example, in the book entitled *Modem Handbook for the Communications Professional* by Cass Lewart, on pages 258–260, the author describes a Peak-to-Average Ratio ("PAR") meter. The meter uses a PAR signal consisting of 16 harmonically unrelated sine waves of different amplitudes. The receiver portion of the instrument is said to compute the ratio of the received peak energy to average energy. This ratio is said to relate to both attenuation and delay distortion and is said to give an indication of the circuit quality. According to the author, the readings are most sensitive to envelope delay, noise, and attenuation distortion, but will not indicate which particular parameter is at fault. A PAR reading which differs by at least four units from a previous reading is said to indicate some problem on the transmission line and should be followed by more detailed testing.

An article entitled "On Minimizing the Peak-to-Average Power Ratio for the Sum of N Sinusoids" by D. R. Gimlin and C. R. Patisaul that is printed in 41 *IEEE Transactions on Communications*, p. 631–635 (Apr. 1993), discusses the phasing of equal amplitude, equally spaced N frequency sinusoids so that the peak-to-average power ratio of the sum is 2.6 decibels. Such disclosures, however, often do not show a modem that is sufficiently accurate in determining the non-linearity of the electrical characteristics of a telephone line, or that is sufficiently inexpensive, or that operates quickly enough.

SUMMARY OF THE INVENTION

In a principal aspect, the present invention relates to a method and apparatus employing a modem line probing signal. The signal includes a finite plurality of different tones or frequencies, where the tones have a predetermined relative phase relationship.

According to one aspect of the invention, a modem incorporates a transmitter for generating a line probing signal having a finite plurality of different tones, and the tones have a predetermined relative phase relationship. According to another aspect of the invention, a modem incorporates a receiver to accepting and distinguishing a finite plurality of different tones, where the tones have a predetermined relative phase relationship.

With such a signal, the non-linearity of the electrical characteristics of a telephone line may be measured with increased accuracy. By using such transmitter output signal level measurements, various characteristics of the modem may be selected. Such characteristics include, for example, the transmitter signal level, transmitter signal pre-emphasis, carrier frequency, and signal bandwidth. Consequently, the accuracy and reliability of data transmission over a communication medium may be improved.

These and other objects, features, and advantages of the present invention are discussed or apparent in the following detailed description.

BRIEF DESCRIPTION OF THE DRAWINGS

A preferred embodiment of the present invention is described herein with reference to the drawing, wherein.

DETAILED DESCRIPTION OF THE PREFERRED EMBODIMENT

Figure 1:
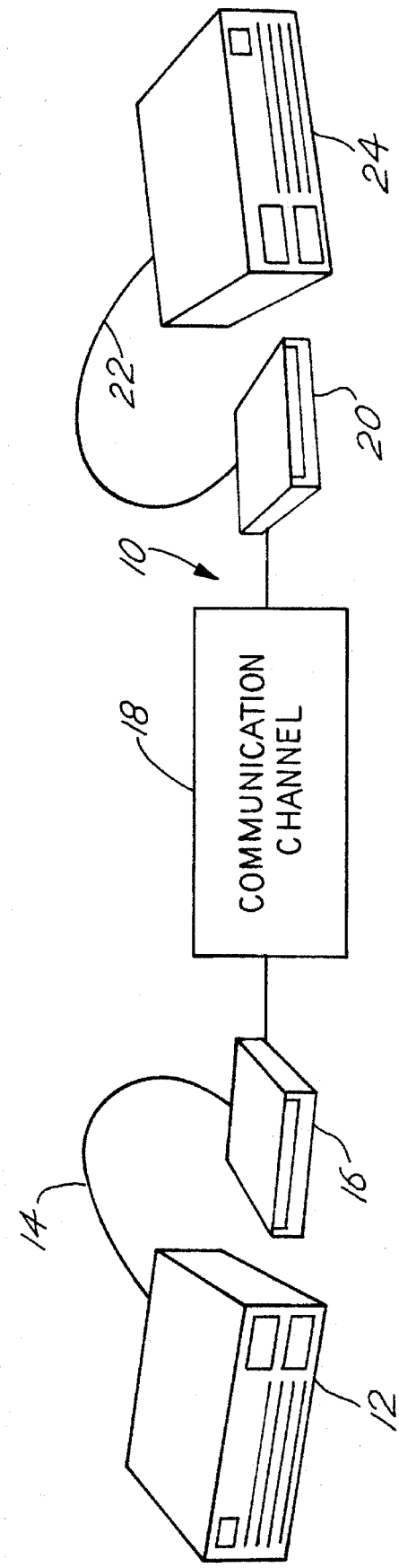
FIG. 1 is a schematic block diagram of a preferred embodiment of the present invention used in connection with two exemplary computers and two exemplary modems adapted to transmit signals to each other over a communication channel.

Referring to FIGS. 1–4, a preferred form of the present invention may be used in a system 10. As shown in FIG. 1, the system 10 comprises a digital signal producer, such as a computer 12, that communicates over a bus 14 with a modem 16. The modem 16, in turn, transmits signals to, and receives signals from, a communication channel or medium 18. The communication channel 18, in turn, is connected to another modem 20 that communicates over a bus 22 with another digital signal producer or computer 24.

It is to be understood that the computers 12, 24 are shown for the purposes of illustrating the invention. The computers 12, 24 could be interchanged, for example, with other equipment that generates a data signal to be sent over the communication channel 18.

For the purposes of illustrating the present invention only, the modem 20 will be considered as transmitting a probing signal. The modem 16 will be considered as receiving and observing the signal sent by the modem 20 and advising the modem 20 regarding the signal received over the communication channel 18.

The communication channel 18, of course, may be comprised of a variety of different media, including, for example, a cellular telephone network, a satellite-based communication system, or a conventional switched telephone network. Such systems generally include a multiplicity of elements, including multiplexing and switching equipment.

Figure 2:
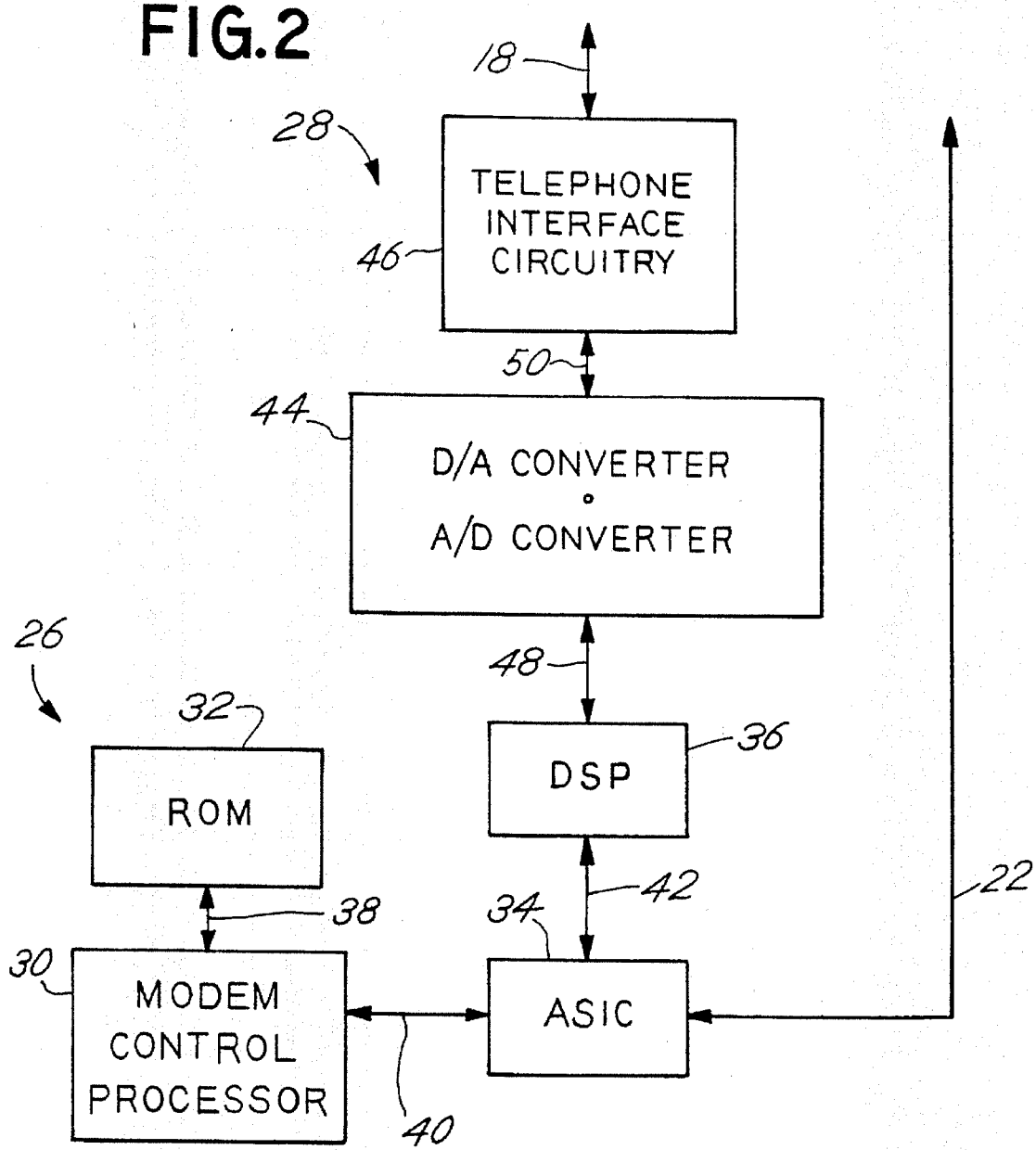
FIG. 2 is a schematic block diagram of modem hardware of a form suitable for use in connection with the preferred embodiment shown in FIG. 1.

Referring to FIG. 2, a preferred form the modem 20 comprises a transmitter/receiver 26 and direct access arrangement ("DAA") 28. The transmitter/receiver 26 comprises a modem control processor 30, a read-only memory ("ROM") 32, an application specific integrated circuit ("ASIC") 34, and a digital signal processor ("DSP") 36. The components are interconnected as shown by a series of busses 38, 40, 42.

The direct access arrangement 28 includes a digital to analog ("D/A") and analog to digital ("A/D")converter 44 ("converter 44") and telephone interface circuitry 46. The components are interconnected, as shown in FIG. 2, by a bus 48 between the DSP 36 and converter 44 and a bus 50 between the converter 44 and interface circuitry 46. The interface circuitry 46 transmits signals to, and receives signals from, the communication channel 18.

The processor 30, ROM 32, ASIC 34, and DSP 36 may be considered as cooperatively defining a transmitter that may, for example, be used within the modems 16, 20. The transmitter generates a line probing signal, comprised of a finite plurality of tones, that is sent via the bus 48, to the DAA 28 and the communication channel 18. The processor 30, ROM 32, ASIC 34, and DSP 36 may also be considered as cooperatively defining a receiver that may, for example, be used within the modems 16, 20. The receiver accepts and distinguishes the tones of a line probing signal that is sent to it via the communication channel 18 and DAA 28.

A modem of the type shown in FIG. 2 is widely available. Such devices are found, for example, in the Sportster and Courier series of modems manufactured by the U.S. Robotics, Inc. of Skokie, Ill.

One preferred form of a line probing signal made in accordance with the present invention is the summation of twenty-two substantially equal amplitude cosines spaced approximately 150 Hertz apart at frequencies from 150 Hertz to 3750 Hertz. Tones at 900 Hertz, 1200 Hertz, and 1800 Hertz are omitted. The phases for the cosines are specified in the following Table 1:

TABLE 1

| Cosine Frequency in Hertz | Phase in Degrees |
| --- | --- |
| 150 | 0 |
| 300 | 0 |
| 450 | 180 |
| 600 | 180 |
| 750 | 0 |
| 1050 | 0 |
| 1350 | 0 |
| 1500 | 180 |
| 1650 | 0 |
| 1950 | 0 |
| 2100 | 0 |
| 2250 | 180 |
| 2400 | 0 |
| 2550 | 0 |
| 2700 | 0 |
| 2850 | 0 |
| 3000 | 180 |
| 3150 | 180 |
| 3300 | 0 |
| 3450 | 180 |
| 3600 | 180 |
| 3750 | 180 |

In yet another preferred embodiment of the present invention, a line probing signal consists of the summation of twenty-one substantially equal amplitude cosines spaced approximately 150 Hertz apart at frequencies from 150 Hertz to 3750 Hertz. Tones at 900 Hertz, 1200 Hertz, 1800 Hertz, and 2400 Hertz are omitted. The phases for the cosines are specified in the following Table 2:

TABLE 2

| Cosine Frequency in Hertz | Phase in Degrees |
| --- | --- |
| 150 | 0 |
| 300 | 180 |
| 450 | 0 |
| 600 | 0 |
| 750 | 0 |
| 1050 | 0 |
| 1350 | 0 |
| 1500 | 0 |
| 1650 | 180 |
| 1950 | 0 |
| 2100 | 0 |
| 2250 | 180 |
| 2550 | 0 |
| 2700 | 180 |
| 2850 | 0 |
| 3000 | 180 |

TABLE 2-continued

| Cosine Frequency in Hertz | Phase in Degrees |
| --- | --- |
| 3150 | 180 |
| 3300 | 180 |
| 3450 | 180 |
| 3600 | 0 |
| 3750 | 0 |

Thus, the line probing signal of the present invention may be considered a finite plurality of tones. The tables above express the frequency in terms of a cosine and the phase in terms of degrees. Of course, other expressions (such as, for example, sine and radian designations) can also be used to express the same (or equivalent) relationships. Such equivalency must be borne in mind when considering the nature and scope of the present invention.

As is a common industry practice, the line probing signal may be transmitted in two stages, L1 and L2. Stage L1 comprises the probe signal sent at increased power above the nominal transmission power of the modem 20 for approximately 15 periods of the 150 Hertz tone (about 100 to 160 milliseconds). The power of the line probing signal in stage L1 is such that the peaks of the probing signal are approximately 10 to 12 decibels above the average power of the nominal modem transmission signal.

Stage L2 is a continuation of the line probing signal sent at the nominal power of the modem 20. The duration of stage L1 is sufficient for an estimation of an amplitude of a tone with plus or minus 0.4 decibel error with 95% confidence.

One important purpose of the line probing signal is to measure non-linearity in the communication channel 18. After the non-linearity of the channel 18 is measured, the output signal level of the transmitting modem 20 can be more accurately controlled in order to reduce the non-linearity distortion of the data signals sent from the modem 20 to the modem 16.

After the non-linearity of the channel 18 is measured, those skilled in the art are capable of controlling the power at which the modem 20 transmits data in order to strike a better balance between non-linearity distortion versus other types of signal impairments. By using a probing signal generated in accordance with the present invention, the reliability of the non-linearity measurements of the communication channel 18 can be improved substantially.

Assuming a pass band modem signal S has Gaussian distribution, S will exceed 12 decibels times the nominal signal S power with the probability 0.00006 (4 sigma) which corresponds to a block error rate of about 0.02. The applicant has discovered that the nonlinearity of the channel 18 can best be measured in a range of amplitudes between 4 sigma points, or a power level of about 10 to 12 decibels above the average power of the transmission signal.

Modem signals themselves are a poor indicator of non-linearity of the channel 18. In order to test non-linearity, the test signal should have many peaks in the proper range of amplitude. Whereas a modem signal has infrequent peaks 10 or 12 decibels above the average signal power, the test signal should have a large number at or near 10 to 12 decibels above the average signal power.

In order to improve the test signal, the inventors have found it useful to measure the power of the signal peaks and compare it to the root mean square ("RMS") average power of the test signal. A signal with a minimum peak-to-RMS average ratio (PAR) is an optimum signal. In other words, a signal with a minimum PAR has the highest concentration of energy in its peaks. Therefore, it produces the highest energy distortion terms caused by non-linearity in the signal region of interest (which is approximately 10 to 12 decibels above the average signal power).

As shown in Tables 1 and 2, the inventors have found it advantageous and sufficient to use only two phases (i.e., approximately 0° and 180°) for the frequencies that comprise the composite line probing signal. Using only two phases simplifies the implementation of the composite line probing signal. For the phase relationships shown in Table 1, the line probing signal has a PAR of approximately 4.2 decibels. For the phase relationship shown in Table 2, the line probing signal has a PAR of approximately 4 decibels.

Although the PAR could be reduced somewhat by using arbitrary phases, for most applications the inventors have found that the reduction in PAR is not significant enough to justify the increased complexity of implementation. However, phase degrees other than those shown in Tables 1 and 2 and/or an increased number of phases could be used if somewhat increased accuracy is desired.

Figure 3:
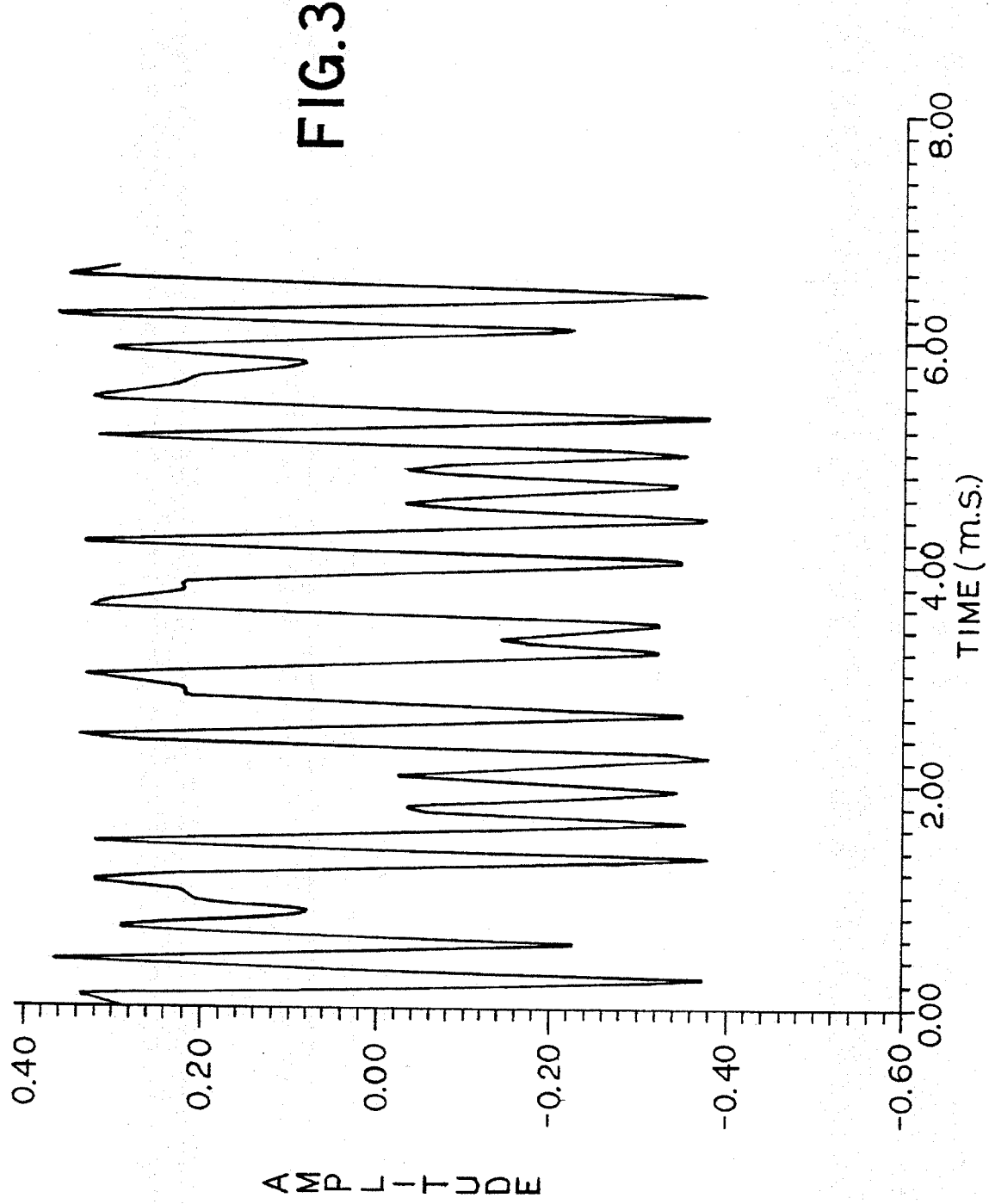
FIG. 3 is an enlarged wave form illustrating a first preferred form of a line probing signal generated in accordance with the preferred embodiment shown in FIG. 1.
Figure 4:
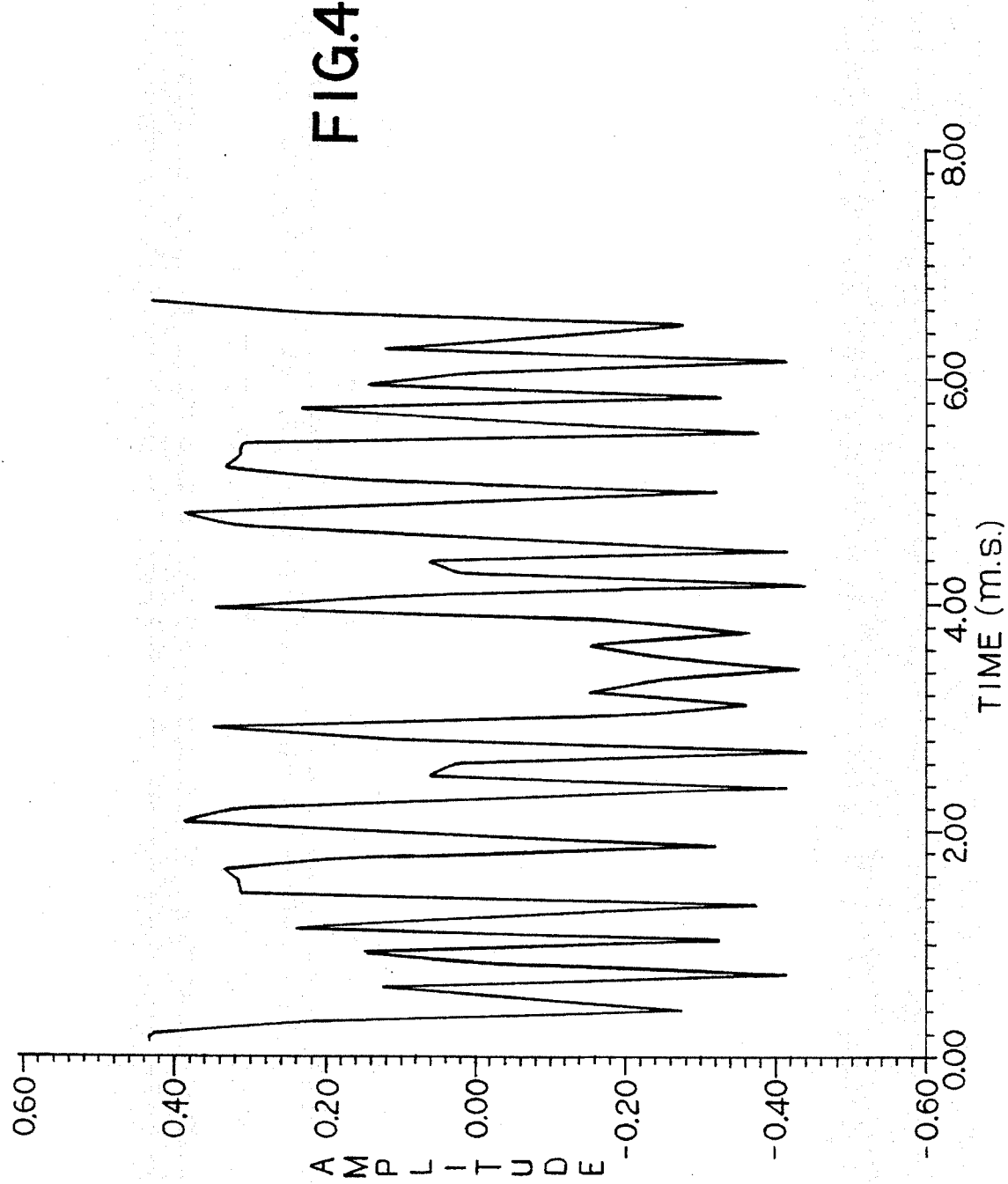
FIG. 4 is an enlarged wave form illustrating a second preferred form of a line probing signal generated in accordance with the preferred embodiment shown in FIG. 1.

One period of a line probing signal generated from the values shown in Table 1 is illustrated in FIG. 3. The graph shows the signal amplitude as a function of time (ms). The signal has at least 16 positive peaks. One period of another line probing signal generated from the values shown in Table 2 is illustrated in FIG. 4. The signal has at least 18 positive peaks.

Consider, for purposes of illustration, the line probing signal shown in FIG. 3. The signal has a PAR of 4.2 decibels. During stage L1, the signal should be transmitted at approximately 6 decibels above the nominal modem signal power in order to have peak amplitudes in the 10 to 12 decibel range. Thus, for the signal shown in FIG. 3, stage L1 would be generated at approximately 6 decibels above the nominal modem signal transmission power for about 160 milliseconds.

For stage L2, the line probing signal of FIG. 3 should be returned to the nominal 4.2 decibel power value. As such, it would represent the peak power of the modem signal sent at approximately 6 decibels below the nominal power level.

Based on Tables 1 and 2 and FIGS. 3 and 4, those skilled in the art can prepare a computer program or implement circuitry resulting in a line probing signal on the communication channel 18 similar to signals shown in the exemplary FIGS. 3 or 4. The information from the Tables may be stored in the ROM 32. The ROM 32 provides the necessary data to the processor 30, such that the ASIC 34, DSP 36, converter 44, and interface circuitry 46 covert the digital output of the processor 26 to an analog signal of the type shown in FIGS. 3 or 4.

The probing signal is sent from the modem 20 to the modem 16 in order to measure, among other things, the non-linearity of the communication channel 18. The line probing signal received by the modem 16 is measured by modem 16 according to known techniques. The measurements are then analyzed by known techniques to determine the non-linearity of the channel 18.

The modem 16 then requests that the transmitting modem 20 set the signal level and other parameters so as to best perform on the channel 18. By known techniques, the modem 16 can determine the optimum signal level of the modem 20, so as to strike a balance between the non-linearity of the channel 18 and other signal impairments. If the signal level of the modem 20 is reduced, the non-linearity distortion is reduced, but the effects of other signal impairments are generally increased. This occurs because the signal-to-impairment ratio is decreased.

After the optimum gain is calculated, the modem 16 transmits data to the modem 20 so that it may adjust the level of its transmission signal accordingly. After the signal adjustment, data can be transmitted from the modem 20 to the modem 16 with increased accuracy and reliability.

Those skilled in the art will recognize that the preferred embodiment described in the specification may be altered and modified without departing from the true spirit and scope of the invention as described in the appended claims. For example, in addition to measuring phase line distortion, other impairments can be measured, such as amplitude distortion.

Further, in a manner similar to that described above, the modem 20 transmitter characteristics are adjusted based on the analysis in the modem 16 of a line probing signal transmitted by the modem 20. Likewise, in general, the modem 16 will transmit a line probing signal to the modem 20, whereby the modem 20 will indicate transmitter characteristics to the modem 16.

We claim:

1. A modem, associated with a computer, for generating a line probing signal over a communication channel for use by a receiving modem to determine the non-linearity of the electrical characteristics of said communication channel comprising, in combination:

a first bus for communicating with said computer;

a transmitter for generating a finite plurality of different tones, said tones having a predetermined relative phase relationship; and a second bus for delivering signals, including said tones, to said communication channel, said tones being divided into a first group having a first predetermined phase and a second group having a second predetermined phase, said first and second predetermined phases having a predetermined phase relationship, said predetermined phase relationship arranged to substantially minimize the peak to root mean square average value of said line probing signal;

wherein said transmitter comprises a signal generator for generating said line probing signal at a first power level for a first predetermined time period and for generating said line probing signal at a second power level for a second predetermined time period later than said first predetermined time period;

said line probing signal at said first power level comprising tones having a plurality of amplitude peaks at a power level above the average signal power level of a nominal transmission data signal so as to attain peak amplitudes in the non-linear region of said communication channel.

2. A modem, as claimed in claim 1 wherein said predetermined phase relationship is defined substantially by 0 and 180 degrees.

3. A modem, as claimed in claim 2 wherein the frequency and phase relationships between said tones are substantially as set forth in the following table, wherein frequency is expressed in Hertz and phase is expressed in degrees:

| Cosine Frequency, Hertz | Phase, Degrees |
|---|---|
| 150 | 0 |
|  | (reference) |
| 300 | 0 |
| 450 | 180 |
| 600 | 180 |
| 750 | 0 |
| 1050 | 0 |
| 1350 | 0 |
| 1500 | 180 |
| 1650 | 0 |
| 1950 | 0 |
| 2100 | 0 |
| 2250 | 180 |

-continued

| Cosine Frequency, Hertz | Phase, Degrees |
|---|---|
| 2400 | 0 |
| 2550 | 0 |
| 2700 | 0 |
| 2850 | 0 |
| 3000 | 180 |
| 3150 | 180 |
| 3300 | 0 |
| 3450 | 180 |
| 3600 | 180 |
| 3750 | 180. |

4. A modem, as claimed in claim 2 wherein the frequency and phase relationships between said tones are substantially as set forth in the following table, wherein frequency is expressed in Hertz and phase is expressed in degrees:

| Cosine Frequency, Hertz | Phase, Degrees |
|---|---|
| 150 | 0 |
| 300 | 180 |
| 450 | 0 |
| 600 | 0 |
| 750 | 0 |
| 1050 | 0 |
| 1350 | 0 |
| 1500 | 0 |
| 1650 | 180 |
| 1950 | 0 |
| 2100 | 0 |
| 2250 | 180 |
| 2550 | 0 |
| 2700 | 180 |
| 2850 | 0 |
| 3000 | 180 |
| 3150 | 180 |
| 3300 | 180 |
| 3450 | 180 |
| 3600 | 0 |
| 3750 | 0. |

5. A modem, as claimed in claim 1, wherein said first predetermined time period is approximately 160 milliseconds.

6. A modem, as claimed in claim 5, wherein the ratio of said first power level to said second power level is approximately 6 decibels.

7. A method for a modem, associated with a computer, for generating a line probing signal over a communication channel for use in determining the non-linearity of the electrical characteristics of said communication channel comprising, in combination, the steps of:
   (a) generating a finite plurality of different tones, said tones
      (1) having a predetermined relative phase relationship and
      (2) being divided into a first group having a first predetermined phase and a second group having a second predetermined phase, said first and second predetermined phases having a predetermined phase relationship, said predetermined phase relationship arranged to substantially minimize the peak to root mean square average value of said line probing signal;
   (b) generating said line probing signal at a first power level for a first predetermined time period, said first power level being above the average signal power level of a nominal transmission data signal so as to attain peak amplitudes in the non-linear region of said communications channel, and generating said line probing signal at a second power level different from said first power level for a second predetermined time period later than said first predetermined time period; and
   (c) delivering said tones to said communication channel.

8. A modem, as claimed in claim 7, wherein said predetermined phase relationship is defined substantially by 0 and 180 degrees.

9. A method, as claimed in claim 8, wherein the frequency and phase relationships between said tones are substantially as set forth in the following table, wherein frequency is expressed in Hertz and phase is expressed in degrees:

| Cosine Frequency, Hertz | Phase, Degrees |
|---|---|
| 150 | 0 (reference) |
| 300 | 0 |
| 450 | 180 |
| 600 | 180 |
| 750 | 0 |
| 1050 | 0 |
| 1350 | 0 |
| 1500 | 180 |
| 1650 | 0 |
| 1950 | 0 |
| 2100 | 0 |
| 2250 | 180 |
| 2400 | 0 |
| 2550 | 0 |
| 2700 | 0 |
| 2850 | 0 |
| 3000 | 180 |
| 3150 | 180 |
| 3300 | 0 |
| 3450 | 180 |
| 3600 | 180 |
| 3750 | 180. |

10. A method, as claimed in claim 8, wherein the frequency and phase relationships between said tones are substantially as set forth in the following table, wherein frequency is expressed in Hertz and phase is expressed in degrees:

| Cosine Frequency, Hertz | Phase, Degrees |
|---|---|
| 150 | 0 |
| 300 | 180 |
| 450 | 0 |
| 600 | 0 |
| 750 | 0 |
| 1050 | 0 |
| 1350 | 0 |
| 1500 | 0 |
| 1650 | 180 |
| 1950 | 0 |
| 2100 | 0 |
| 2250 | 180 |
| 2550 | 0 |
| 2700 | 180 |
| 2850 | 0 |
| 3000 | 180 |
| 3150 | 180 |
| 3300 | 180 |
| 3450 | 180 |
| 3600 | 0 |
| 3750 | 0. |

11. A method, as claimed in claim 7, wherein said first predetermined time period is approximately 160 milliseconds.

12. A method, as claimed in claim 11, wherein the ratio of said first power level to said second power level is approximately 6 decibels.

* * * * *